United States Patent [19]
Kang et al.

[11] Patent Number: 5,596,053
[45] Date of Patent: Jan. 21, 1997

[54] HIGH TRANS-1,4-POLYBUTADIENE AND CATALYST AND PROCESS FOR PREPARING CRYSTALLINE HIGH TRANS-1,4-POLY-BUTADIENE

[75] Inventors: Jung W. Kang, Clinton; Jason T. Poulton, Canton, both of Ohio

[73] Assignee: Bridgestone/Firestone, Inc., Akron, Ohio

[21] Appl. No.: 455,772

[22] Filed: May 31, 1995

[51] Int. Cl.$^6$ .............................. C08F 136/06; C08F 4/70
[52] U.S. Cl. .................... 526/132; 526/139; 526/142; 526/143; 526/335; 502/117; 502/121; 502/125
[58] Field of Search ...................................... 526/132, 335, 526/139, 142, 143; 502/121, 125, 117

[56] References Cited

U.S. PATENT DOCUMENTS

| | | | |
|---|---|---|---|
| 3,910,869 | 10/1975 | Throckmorton | 526/335 X |
| 3,926,933 | 12/1975 | Naylor | 526/335 X |
| 5,037,912 | 8/1991 | Patterson et al. | 526/174 |

*Primary Examiner*—Fred Teskin
*Attorney, Agent, or Firm*—Frank J. Troy, Sr.

[57] ABSTRACT

Diene polymers having a high content of trans-1,4 addition and two distinct melting points in the ranges of 30° C. to 50° C. and 70° C. to 130° C. are prepared by polymerizing a 1,3-diene monomer in a hydrocarbon solvent in the presence of a catalyst composition comprising (a) a carboxylated nickel oxy borate compound; (b) an orKanoaluminum compound; (c) a triaryloxy phosphorus compound and (d) a carboxylic acid preferably a fluorinated carboxylic acid. The resultant polymers are useful as additives to tire rubbers to improve processability by reducing compound Mooney viscosity and reducing the shrinkage of various compound stocks.

21 Claims, No Drawings

HIGH TRANS-1,4-POLYBUTADIENE AND CATALYST AND PROCESS FOR PREPARING CRYSTALLINE HIGH TRANS-1,4-POLY-BUTADIENE

FIELD OF THE INVENTION

The present invention relates to a process for the preparation of crystalline and/or resinous high trans-1,4-polybutadienes, to a catalyst system for use in the process and to the resultant polymer.

BACKGROUND OF THE INVENTION

Various catalyst systems have been employed to produce high trans-1,4-polybutadienes. Certain catalyst systems have been used to produce high trans-1,4-polybutadiene having two distinct melting points. U.S. Pat. No. 5,174,838, to Sandstrom et al, discloses a cobalt based catalyst to produce a trans 1,4-polybutadiene rubber having 75% to 85% of trans 1,4-content, 12% to 18% of 1,2-content, 3% to about 8% of cis 1,4-content and, in its uncured state, having a major melting point in a range of about 35° C. to about 45° C. and a second minor melting point in the range of about 55° C. to about 65° C. U.S. Pat. No. 5,037,912, to Patterson et al, discloses an organolithium and alkali metal alkoxide catalyst in a process for synthesizing trans 1,4-polybutadiene having a trans isomer content of about 80% to about 90% and two distinct melting points, namely a first melting point of about 60° C. to about 80° C. and a second melting point of about 135° C. to about 155° C.

High trans polybutadienes have been used as rubber additive such as in Japan Patent Application Publication No. Hei 3-65828 displaying the blends of 3 to 20 parts by weight of a high trans 1,4-polybutadiene having 75% to 90% of trans 1,4-content and 3% to 10% of vinyl linkages and 97 to 80 parts by weight of a diene-type rubber.

SUMMARY OF THE INVENTION

Diene polymers having a high content of trans-1,4 addition and two distinct melting points in the ranges of 30° C. to 60° C. and 70° C. to 130° C. are prepared by polymerizing a 1,3-diene monomer in a hydrocarbon solvent in the presence of a catalyst composition comprising (a) a carboxylated nickel oxy borate compound; (b) an organoaluminum compound; (c) a triaryloxy phosphorus compound and (d) a carboxylic acid preferably a fluorinated carboxylic acid. The resultant polymers are useful as additives to tire rubbers to improve processability by reducing compound Mooney viscosity and reducing the shrinkage of various compound stocks.

DESCRIPTION OF THE PREFERRED EMBODIMENTS

As indicated, the high trans-1,4 diene polymers produced by the method of the invention are prepared by polymerizing a 1,3-diene monomer in the presence of the novel catalyst composition. The 1,3-diene monomers which may be employed are conjugated dienes and include 1,3-butadiene, isoprene, 1,3-pentadiene and the like. The preferred 1,3-diene monomer is 1,3-butadiene.

The catalyst system in the present invention contains four components: (a) a carboxylated metal oxy borate, (b) an organoaluminum compound, (c) an organophosphorus compound, and (d) a carboxylic acid.

The carboxylated metal oxy borate compounds which are employed as component (a) of the catalyst composition of the invention are compounds having either of the structures:

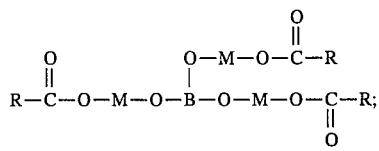

or

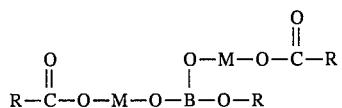

wherein R and R are alkyl radicals containing from 1 to 17 carbon atoms, preferably 7 to 17 carbon atoms, and M is nickel. It should be noted that in certain instances, compounds in which R is less than 7 may be employed although the use of such compounds is not preferred due to their lack of solubility in hydrocarbon solvents. Nonetheless, such compounds may be utilized with certain mixtures of solvents. For the sake of convenience, these compounds may be represented by the shorthand formulae (RCOOMO)$_3$B or (RCOOMO)$_2$BOR, wherein R, R, and M are as defined above.

These carboxylated metal oxy borate compounds, such as the carboxylated nickel borate may be prepared by methods known in the art such as, for example, by reacting a nickel of a carboxylic acid with an alkoxide of boron as described in detail in U.S. Pat. No. 3,296,242, the disclosure of which is incorporated herein by reference. The preferred carboxylated metal oxy borate compounds employed in the catalyst compositions of the invention are those represented by the formula (RCOOMO)$_3$B, wherein M is nickel and R is an alkyl radical of from 7 to 11 carbon atoms. Also, for the sake of convenience, the carboxylated metal oxy borate compounds of the invention are hereinafter referred to as simply nickel borates which in the examples are designated by the abbreviations NiOB.

It should be noted at this point that the carboxylated nickel borate compounds of the invention have been employed as polymerization catalysts components in the preparation of high cis-1,4-polybutadiene polymers in U.S. Pat. No. 4,562,172 to Kang et al.

The "organoaluminum compound" as employed herein, refers to organoaluminum compounds which correspond to the formula:

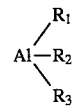

wherein R$_1$ is selected from the group consisting of alkyl (including cycloalkyl), aryl, alkaryl, arylalkyl, alkoxy, fluorine, and hydrogen, R$_2$ and R$_3$ being selected from the group of alkyl (including cycloalkyl), aryl, alkaryl, and arylalkyl.

Illustrative examples of compounds corresponding to the above formula which may be utilized include diethyl aluminum fluoride, di-n-propylaluminum fluoride, di-n-butylaluminum fluoride, diisobutylaluminum fluoride, dioctylaluminum fluoride, diphenylaluminum fluoride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexy aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzylaluminum, and other triorganoaluminum compounds. Also included are dialkylaluminum alkoxides such as diethylaluminum ethoxide, diisobutylaluminum ethoxide, dipropylaluminum methoxide, and the like. Hydrides of such organoaluminum compounds may also be utilized including diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and the like.

The preferred organoaluminum compounds are the trialkyl aluminum compounds such as trimethyl aluminum, triethyl aluminum, tri-n-propyl aluminum, tri-n-butyl aluminum, triisobutyl aluminum, trioctyl aluminum and the like, and of these, triisobutyl aluminum is particularly preferred.

Organophosphorus compounds useful as component (c) of the catalyst system correspond to the formula $(ArO)_3P$ wherein Ar is a substituted or unsubstituted aryl group. The substituted and unsubstituted aryl groups are typically aromatic hydrocarbons having 6 to 20 carbon atoms, including phenyl or naphthyl groups optionally having non-reactive substituents such as $C_1-C_6$ alkyl groups or alkoxy groups to form 4-butylphenyl, tolyl, 4-butoxyphenyl, methoxyphenyl and the like. The preferred organophosphorus compound for use in the present catalyst system is triphenyl phosphite.

The carboxylic acid containing compounds useful in the present invention as component (d) of the catalyst compositions include carboxylic acids and fluorinated carboxylic acids. Suitable carboxylic acids include $C_2-C_{12}$ aliphatic and $C_6-C_{18}$ aromatic carboxylic acids including acetic acid, propionic acid, butyric acid, decanoic acid, benzoic acid and the like, as well as $C_2-C_{18}$ dicarboxylic acids including terephthalic acid, isophthalic acid, oxalic acid and the like. The preferred carboxylic acids for use as component (d) in the catalyst system are fluorinated carboxylic acids. The fluorinated carboxylic acids may be partially or fully fluorinated, preferably fully fluorinated. Suitable fluorinated carboxylic acids include but are not limited to fluoroacetic acid, difluoroacetic acid, and trifluoroacetic acid, as well as any of the above carboxylic acids containing fluorine substituents. The preferred compound for use as component (d) is trifluoroacetic acid.

The four catalyst components interact to form the active catalyst. Accordingly, the optimum concentration for any one component is dependent upon the concentration of each of the other components. In the catalyst system of this invention, the polymerization of a 1,3-diene monomer to diene polymer may be conducted using a broad range of catalyst component concentrations. Thus, the molar ratio of catalyst components a, b, c and d (defined above) is preferably as follows: a:b is between about 1:1 to 1:70, preferably 1:1 to 1:20; a:c is between 1:0.1 to 1:10; and a:d is between 1:1 to about 1:70, preferably 1:1 to 1:20. The preferred molar ratios of a:b:c:d are from 1:1.5:1:1.5 to 1:15:1:15.

The four catalyst components may be introduced into the polymerization system in several ways. Thus, the four catalyst components may be charged to a solution of the 1,3-diene in a stepwise or simultaneous manner which is commonly referred to in the polymerization art as an "in-situ" catalyst charge procedure. Alternatively, the catalyst may also be prepared out, side of the polymerization system by a procedure in which all of the catalyst components are mixed in the presence of a small amount of 1,3-diene monomer in an inert diluent and the complete blend is then added to the polymerization system.

The concentration of the total catalyst composition employed in the method of the invention can vary considerably and is dependent upon factors such a purity, rate of polymerization desired, temperature, and the like. Accordingly, specific overall concentrations of the catalyst compositions cannot be set forth except to state that such concentrations are catalytically effective amounts. Generally the NiOB catalyst is employed in amounts ranging from 0.05 to 10 mM phgm. The remaining catalyst components are employed in the previously recited ratio amounts. Some specific concentrations and ratios which produce polybutadiene polymers having the desired properties are illustrated in the examples below.

The polymerizations of this invention are conducted in an inert hydrocarbon solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable hydrocarbon solvents which may be employed include aliphatic, aromatic or cycloaliphatic hydrocarbons such as hexane, pentane, toluene, benzene, cyclohexane and the like. The preferred hydrocarbon solvents a.e aliphatic hydrocarbons and of these solvents, hexane is particularly preferred.

The polymerizations of the invention should be carried out under an inert atmosphere such as nitrogen and precautions should be taken to exclude materials such as water and air which will deactivate the catalyst components.

The temperatures employed in the polymerization are not critical and may range from about 0° C. to about 150° C. Preferred polymerization temperatures may range from about 25° C. to about 150° C. It should be noted that the catalyst compositions of the invention provide the capability of more consistently using higher polymerization temperatures than those which have heretofore been actually exemplified in most prior art catalyst systems.

The polymerizations may be terminated in well known manner by the addition of a small amount of a lower alcohol such as methanol and an antioxidant such as di-t-butyl cresol.

The diene polymer product can be recovered from solution in any known manner such as by coagulation in an excess of methanol or other lower alkanol. The polymer product can be dried using any convenient method such as vacuum drying, drum drying, extruder drying, and the like.

As mentioned above, the crystalline diene polymers produced by the method of the invention have a high content of trans-1,4 addition along with two distinct melting points. The first melting point (Tm1) ranges from 30° C. to 60° C. and the second melting point (Tm2) ranges from 70° C. to 130° C. the second melting point (Tm2) is controlled by the polymerization temperature, but the first melting point (Tm1) is always in the range of 30° to 60° C., preferably 45° to 50° C. at any polymerization temperature. The diene polymers produced according to the present invention have trans-1,4 addition contents of 80% to 95% and preferably from about 85% to 95%, most preferably from about 88% to about 92% and a molecular weight ranging from about 5,000 to about 150,000.

The crystalline or resinous high trans content diene polymers produced according to the process of the present invention preferably possess a microstructure having 88% to 92% of 1,4-trans units, 2% to 5% of cis units and 6% to 8% vinyl units. These crystalline diene polymers are useful as additives to natural and synthetic rubbers to improve processability of the rubber compounds by the reducing dump temperature, by reducing Mooney viscosity of the compounds and by reducing the shrinkage of the various compound stocks.

The crystalline or resinous high trans-1,4 polybutadiene polymers produced according to the present invention are typically added to natural rubbers and synthetic rubbers in amounts ranging from 1 to 30 percent by weight, preferably 5 to 20 percent by weight.

The following examples are submitted for the purpose of further illustrating the nature of the present invention and are not to be regarded as a limitation on the scope thereof. Parts and percentages shown in the examples are by weight unless otherwise indicated.

EXAMPLE 1

A two gallon stainless steel reactor equipped with thermometer, stirrer, heating means, pressure means and inlet/outlet ports was purged to establish a nitrogen atmosphere. While maintaining a nitrogen atmosphere, 4086 grams of a butadiene/hexane blend containing 986 grams of 1,3-butadiene (23.7% monomer); 12.0 ml of nickel boro acylate (NiOB: 0.84 molar solution in hexane; 1.0 mM phgm) in 25 ml of hexane, 49 ml of triisobutyl aluminum (TIBAL:0.62 molar solution in hexane; 3.0 mM phgm), 1.32 ml of neat triphenylphosphite (TPP: 0.5 mM phgm) in 25 ml hexane and 7.8 ml of trifluoroacetic acid (TFA: 10.0 mM phgm) in 25 ml hexane were charged to the reactor. The polymerization was then conducted at 79° C. for six hours. The resulting polymer cement was dropped into a five gallon bucket equipped with polyethylene liner containing excess isopropanol and an anti-oxidant. The coagulated resin was collected by filtration and oven dried at 50° C. under vacuum. The conversion of monomer to polymer was 83%. The physical property of the resulting resin was:

| DSV (Dilute Solution Viscosity) | 0.49 |
| % Gel | 0.90 |
| [η] | 0.47 |
| Mn | 17030 |
| Mw | 36047 |
| Mw/Mn | 2.12 |
| Microstructure | |
| 1,4-cis content | 1.9% |
| 1,4-trans content | 91.1% |
| Vinyl content | 7.0% |
| Melting Point (Determined by DSC) | |
| Tm1 | 44.9° C. |
| Tm2 | 86.2° C. |

EXAMPLES 2–6

The general procedure of Example 1 is repeated except that the polymerization temperature was varied as indicated in Table I. The polymerization conditions and properties of the resulting polymers are also shown in Table I.

TABLE 1

| | Example | | | | |
|---|---|---|---|---|---|
| | 2 | 3 | 4 | 5 | 6 |
| % 1,3-butadiene | 25 | 25 | 25 | 25 | 25 |
| NiOB mM phgm | 1.0 | 1.0 | 1.0 | 1.0 | 1.0 |
| TIBAL mM phgm | 3.0 | 3.0 | 3.0 | 3.0 | 3.0 |
| TPP mM phgm | 0.5 | 0.5 | 0.5 | 0.5 | 0.5 |
| TFA mM phgm | 10.0 | 10.0 | 10.0 | 10.0 | 10.0 |
| Molar Ratio | | | | | |
| NiOB/TiBAL/TPP/TFA | 1:3:0.5:10 | 1:3:0.5:10 | 1:3:0.5:10 | 1:3:0.5:10 | 1:3:0.5:10 |
| Polymerization Conditions | | | | | |
| Set Temp. (°C.) | 41 | 60 | 79 | 99 | 121 |
| Max. Temp. (°C.) | 41 | 61 | 83 | 113 | 136 |
| Time, hr. | 24 | 20 | 5 | 5 | 2 |
| Conversion % | 77 | 90 | 88 | 91 | 89 |
| Polymer Properties | | | | | |
| DSV | 0.95 | 0.63 | 0.47 | 0.40 | 0.29 |
| % Gel | 0.8 | 1.1 | 0.8 | 1.1 | 1.7 |
| [η] | 0.96 | 0.65 | 0.48 | 0.41 | 0.28 |
| GPC Data | | | | | |
| Mn ($10^{-4}$) | 3.45 | 2.52 | 1.54 | 1.36 | 1.07 |
| Mw ($10^{-4}$) | 9.63 | 6.27 | 3.48 | 2.73 | 2.25 |
| Mw/Mn | 2.79 | 2.48 | 2.26 | 2.01 | 2.10 |
| Microstructure | | | | | |
| % 1,4-Cis content | 4.7 | 1.4 | 3.2 | 2.5 | 5.9 |
| % 1,4-Trans content | 89.7 | 91.8 | 91.7 | 89.4 | 87.3 |
| % Vinyl content | 5.6 | 6.7 | 5.1 | 8.1 | 6.8 |
| Melting Point by (DSC) | | | | | |
| Tm1 (°C.) | 47.4 | 48.3 | 46.7 | 46.4 | 48.2 |
| Tm2 (°C.) | 98.5 | 90.7 | 85.1 | 80.2 | 76.1 |

EXAMPLES 7–10

The general procedure of Example 1 is repeated except that the amount of NiOB per hundred grams monomer used was varied while the NiOB:TIBAL:TPP:TFA ratio was held constant at 1:3:0.5:10. The polymerization conditions and physical properties of the resulting polymers are shown in Table II.

TABLE II

| | Example | | | |
|---|---|---|---|---|
| | 7 | 8 | 9 | 10 |
| % 1,3-butadiene | 25 | 25 | 25 | 25 |
| NiOB mM phgm | 0.25 | 0.5 | 1.0 | 2.0 |
| TIBAL mM phgm | 0.7 | 1.5 | 3.0 | 6.0 |
| TPP mM phgm | 0.125 | 0.25 | 0.5 | 1.0 |
| TFA mM phgm | 2.5 | 5.0 | 10.0 | 20.0 |
| Molar Ratios | | | | |
| NiOB/TiBAL/TPP/TFA | 1:3:0.5:10 | 1:3:0.5:10 | 1:3:0.5:10 | 1:3:0.5:10 |
| Polymerization Conditions | | | | |
| Set Temp. (°C.) | 107 | 107 | 79 | 93 |
| Max. Temp. (°C.) | 103 | 118 | 83 | 119 |
| Time, hr. | 24 | 4 | 6 | 3 |
| Conversion % | 66 | 87 | 83 | 91 |
| Polymer Properties | | | | |
| DSV | 0.49 | 0.35 | 0.49 | 0.35 |
| % Gel | 0.9 | 0.5 | 0.9 | 1.6 |
| $[\eta]$ | 0.59 | 0.34 | 0.47 | 0.49 |
| GPC Data | | | | |
| Mn ($10^{-4}$) | 1.64 | 1.11 | 1.70 | 0.94 |
| Mw ($10^{-4}$) | 3.05 | 2.48 | 3.60 | 2.14 |
| Mw/Mn | 1.86 | 2.23 | 2.12 | 2.26 |
| Microstructure | | | | |
| % 1,4-Cis content | 3.5 | 2.8 | 1.9 | 5.0 |
| % 1,4-Trans content | 88.4 | 88.8 | 91.1 | 89.0 |
| % Vinyl content | 8.1 | 8.4 | 7.0 | 6.0 |
| Melting Point by (DSC) | | | | |
| Tm1 (°C.) | 44.1 | 46.4 | 44.9 | 48.5 |
| Tm2 (°C.) | 80.4 | 67.0 | 86.2 | 78.9 |

EXAMPLES 11–16

The general procedure of Example 1 is repeated except that the Ni levels, catalyst ratios and polymerization temperatures are varied as shown in Table III. The polymerization conditions and properties of the resulting polymers are also shown in Table III.

TABLE III

| | Example | | | | | |
|---|---|---|---|---|---|---|
| | 11 | 12 | 13 | 14 | 15 | 16 |
| 1,3-butadiene | 25 | 25 | 25 | 25 | 25 | 25 |
| NiOB mM phgm | 0.5 | 0.5 | 1.0 | 0.5 | 0.5 | 0.5 |
| TIBAL mM phgm | 1.5 | 1.5 | 6.0 | 3.0 | 3.0 | 3.0 |
| TPP mM phgm | 0.5 | 0.5 | 0.5 | 0.5 | 0.5 | 0.5 |
| TFA mM phgm | 5.0 | 10.0 | 5.0 | 10.0 | 10.0 | 10.0 |
| Molar Ratios | | | | | | |
| NiOB/TiBAL/TPP/TFA | 1:3:1:10 | 1:3:1:20 | 1:6:0.5:10 | 1:6:1:20 | 1:6:1:20 | 1:6.0.5:20 |
| Polymerization Conditions | | | | | | |
| Set Temp. (°C.) | 104 | 110 | 79 | 79 | 99 | 99 |
| Max. Temp. (°C.) | 102 | 106 | 80 | 79 | 100 | 109 |
| Time, hr. | 22 | 6 | 6 | 23 | 4 | 2 |
| Conversion % | 81 | 72 | 78 | 89 | 83 | 80 |
| Polymer Properties | | | | | | |
| DSV | 0.44 | 0.41 | 0.41 | 0.63 | 0.40 | 0.39 |
| % Gel | 0.7 | 0.4 | 0.4 | 1.1 | 0.6 | 0.1 |
| $[\eta]$ | 0.45 | 0.49 | 0.39 | 0.61 | 0.40 | 0.37 |
| GPC Data | | | | | | |
| Mn ($10^{-4}$) | 1.63 | 1.39 | 1.23 | 2.10 | 1.41 | 1.27 |
| Mw ($10^{-4}$) | 2.97 | 2.63 | 3.23 | 4.97 | 2.81 | 2.91 |
| Mw/Mn | 2.08 | 1.89 | 2.62 | 2.37 | 2.00 | 2.29 |
| Microstructure | | | | | | |
| % 1,4-Cis content | 1.4 | 1.3 | 4.1 | | 4.9 | 7.8 |
| % 1,4-Trans content | 91.9 | 90.5 | 89.2 | N/A | 88.9 | 82.0 |
| % Vinyl content | 6.8 | 6.8 | 6.8 | | 6.2 | 10.0 |
| Melting Point by (DSC) | 45.7 | | | | | |
| Tm1 (°C.) | 48.1 | 48.3 | 48.3 | 45.2 | 48.1 | 45.2 |
| Tm2 (°C.) | 86.7 | 83.8 | 78.6 | 89.3 | 83.1 | 76.1 |

EXAMPLES 17–24

The general procedure of Example 1 is repeated except that the concentration of 1,3-butadiene was varied. The polymerization condition and properties of the resulting polymers are shown in Tables IVa and IVb.

TABLE IVa

| | \multicolumn{4}{c}{Example} |
|---|---|---|---|---|
| | 17 | 18 | 19 | 20 |
| % 1,3-butadiene | 23.7 | 31.5 | 25.1 | 31.5 |
| NiOB mM phgm | 1.0 | 1.0 | 1.0 | 1.0 |
| TIBAL mM phgm | 3.0 | 3.0 | 3.0 | 3.0 |
| TPP mM phgm | 0.5 | 0.5 | 0.5 | 0.5 |
| TFA mM phgm | 10.0 | 10.0 | 10.0 | 10.0 |
| Molar Ratios | | | | |
| NiOB/TiBAL/TPP/TFA | 1:3:0.5:10 | 1:3:0.5:10 | 1:3:0.5:10 | 1:3:0.5:10 |
| Polymerization Conditions | | | | |
| Set Temp. (°C.) | 79 | 79 | 93 | 93 |
| Max. Temp. (°C.) | 83 | 97 | 106 | 122 |
| Time, hr. | 6 | 2 | 1 | 0.5 |
| Conversion % | 83 | 87 | 79 | 78 |
| Polymer Properties | | | | |
| DSV | 0.49 | 0.46 | 0.37 | 0.4 |
| % Gel | 0.9 | 0.6 | 0.6 | 0.8 |
| [η] | 0.47 | 0.46 | 0.39 | 0.45 |
| GPC Data | | | | |
| Mn ($10^{-4}$) | 1.70 | 1.64 | 1.07 | 1.32 |
| Mw ($10^{-4}$) | 3.61 | 4.15 | 2.95 | 3.21 |
| Mw/Mn | 2.12 | 2.53 | 2.71 | 2.43 |
| Microstructure | | | | |
| % 1,4-Cis content | 1.9 | 2.4 | 5.5 | |
| % 1,4-Trans content | 91.1 | 89.3 | 89.5 | N/A |
| % Vinyl content | 7.0 | 8.3 | 5.0 | |
| Melting Point by (DSC) | | | | |
| Tm1 (°C.) | 44.9 | 47.7 | 46.8 | 45.9 |
| Tm2 (°C.) | 86.2 | 81.7 | 77.5 | 80.3 |

TABLE IVb

| | \multicolumn{4}{c}{Example} |
|---|---|---|---|---|
| | 21 | 22 | 23 | 24 |
| % 1,3-butadiene | 23.8 | 31.5 | 24.7 | 31.5 |
| NiOB mM phgm | 1.0 | 1.0 | 0.5 | 0.5 |
| TIBAL mM phgm | 3.0 | 3.0 | 1.5 | 1.5 |
| TPP mM phgm | 0.5 | 0.5 | 0.25 | 0.25 |
| TFA mM phgm | 10.0 | 10.0 | 5.0 | 5.0 |
| Molar Ratios | | | | |
| NiOB/TiBAL/TPP/TFA | 1:3:0.5:10 | 1:3:0.5:10 | 1:3:0.5:10 | 1:3:0.5:10 |
| Polymerization Conditions | | | | |
| Set Temp. (°C.) | 121 | 121 | 93 | 93 |
| Max. Temp. (°C.) | 136 | 148 | 96 | 103 |
| Time, hr. | 0.5 | 0.5 | 4 | 4 |
| Conversion % | 84 | 89 | 85 | 86 |
| Polymer Properties | | | | |
| DSV | 0.29 | 0.28 | 0.4 | 0.42 |
| % Gel | 1.7 | 0.6 | 0.7 | 0.6 |
| [η] | 0.28 | 0.29 | 0.45 | 0.47 |
| GPC Data | | | | |
| Mn ($10^{-4}$) | 1.07 | 0.73 | 1.47 | 1.55 |
| Mw ($10^{-4}$) | 2.25 | 1.98 | 2.79 | 4.06 |
| Mw/Mn | 2.10 | 2.71 | 2.07 | 2.62 |
| Microstructure | | | | |
| % 1,4-Cis content | 5.9 | 7.2 | 1.7 | |
| % 1,4-Trans content | 87.3 | 87.2 | 90.8 | N/A |
| % Vinyl content | 6.8 | 5.6 | 7.5 | |
| Melting Point by (DSC) | | | | |
| Tm1 (°C.) | 48.2 | 45.5 | 48.1 | 46.5 |
| Tm2 (°C.) | 76.1 | 60.9 | 81.7 | 77.5 |

We claim:

1. A process for the synthesis of high trans-1,4-polybutadiene comprising contacting a polymerization medium containing 1,3-butadiene monomer and an organic solvent with a catalyst system comprising components: (a) a carboxylated nickel oxy borate compound selected from the group consisting of compounds represented by the formulae $(RCOOMO)_3B$ and $(RCOOMO)_2BOR'$, wherein R and R' are alkyl radicals containing from 1 to 17 carbon atoms and M is nickel; (b) an organoaluminum compound of the formula:

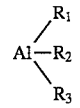

wherein $R_1$ is selected from the group consisting of alkyl, cycloalkyl, aryl, alkaryl, arylalkyl, alkoxy, fluorine, and hydrogen, $R_2$ and $R_3$ being selected from the group of alkyl, cycloalkyl, aryl, alkaryl and arylalkyl; (c) an organophosphorus compound of the formula $(ArO)_3P$ wherein Ar is a substituted or unsubstituted aryl group; and (d) a carboxylic acid or a fluorinated carboxylic acid, and allowing the 1,3-butadiene monomer to polymerize at a temperature in a range of about 0° C. to about 150° C. to produce high trans-1,4-polybutadiene.

2. The process according to claim 1 wherein R and R' of component (a) are alkyl radicals containing from 7 to 17 carbon atoms.

3. The process according to claim 1 wherein component (a) is nickel boro acylate.

4. The process according to claim 1 wherein component (b) is triisobutyl aluminum.

5. The process according to claim 1 wherein component (c) is triphenyl phosphite.

6. The process according to claim 1 wherein (d) is trifluoroacetic acid.

7. The process according to claim 1 wherein the molar ratio of component (a) to (b) is from 1:1 to 1:70.

8. The process according to claim 1 wherein the molar ratio of component (a) to (e) is from 1:0.1 to 1:10.

9. The process according to claim 1 wherein the molar ratio of component (a) to (d) is from 1:1 to 1:70.

10. The process as defined in claim 1 wherein the polymerization is carried out within a temperature range of about 25° C. to about 150° C.

11. A catalyst comprising:

(a) a carboxylated nickel oxy borate compound selected from the group consisting of compounds represented by the formulae (RCOOMO)₃B and (RCOOMO)₂BOR', wherein R and R' are alkyl radicals containing from 1 to 17 carbon atoms and M is nickel; (b) an organoaluminum compound of the formula:

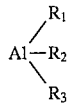

wherein $R_1$ is selected from the group consisting of alkyl, cycloalkyl, aryl, alkaryl, arylalkyl, alkoxy, fluorine, and hydrogen, $R_2$ and $R_3$ being selected from the group of alkyl, cycloalkyl, aryl, alkaryl and arylalkyl; (c) an organophosphorus compound of the formula (ArO)₃P wherein Ar is a substituted or unsubstituted aryl group; and (d) a carboxylic acid or a fluorinated carboxylic acid.

12. The catalyst according to claim 11 wherein R and R' of component (a) are alkyl radicals containing from 7 to about 17 carbon atoms.

13. The catalyst according to claim 11 wherein component (a) is nickel boro acylate.

14. The catalyst according to claim 11 wherein component (b) is triisobutyl aluminum.

15. The catalyst according to claim 11 wherein component (c) is triphenyl phosphite.

16. The catalyst according to claim 11 wherein (d) is trifluoroacetic acid.

17. The catalyst according to claim 11 wherein the molar ratio of component (a) to (b) is from 1:1 to 1:70.

18. The catalyst according to claim 11 wherein the molar ratio of component (a) to (c) is from 1:0.1 to 1:10.

19. The catalyst according to claim 11 wherein the molar ratio of component (a) to (d) is from 1:1 to 1:70.

20. A trans-1,4-polybutadiene thermoplastic polymer having a first melting point ranging between 30° C. to 60° C. and a second melting point ranging between 70° C. to 130° C. produced according to the process of claim 1.

21. The trans-1,4-polybutadiene according to claim 20 having a trans-1,4 content ranging between 80% to 95%.

* * * * *

UNITED STATES PATENT AND TRADEMARK OFFICE
CERTIFICATE OF CORRECTION

PATENT NO. : 5,596,053
DATED : January 21, 1997
INVENTOR(S) : Jung W. Kang, et al.

It is certified that error appears in the above-indentified patent and that said Letters Patent is hereby corrected as shown below:

Column 10, line 60: "(a) to (e)" should read --(a) to (c)--.

Signed and Sealed this

Sixth Day of May, 1997

Attest:

Attesting Officer

BRUCE LEHMAN

Commissioner of Patents and Trademarks